United States Patent Office 3,784,655
Patented Jan. 8, 1974

3,784,655
PRESS POLISHING CURVED TRANSPARENT
POLYCARBONATE SHEET MATERIAL
Richard R. Lewchuk, Allison Park, and Norman Shorr,
Pittsburgh, Pa., assignors to PPG Industries, Inc., Pittsburgh, Pa.
No Drawing. Filed Mar. 16, 1971, Ser. No. 124,928
Int. Cl. B29d 11/00
U.S. Cl. 264—1
5 Claims

ABSTRACT OF THE DISCLOSURE

An improved method of press polishing transparent polycarbonate sheet material between complementary shaped, optically smooth surfaces of press polishing members that have shapes conforming to the shape desired for the transparent polycarbonate sheet involving timely separation.

BACKGROUND OF THE INVENTION

This invention relates to press polishing transparent sheets of plastic materials such as polycarbonate sheets that are used as an element either in transparent laminated glass-plastic windows or are used as monolithic windows.

Canadian Pat. No. 857,789 to Norman Shorr and Charles S. Walker, assigned to PPG Industries, Inc. relates generally to press polishing transparent sheets of polycarbonate materials, and, more particularly, to an improved method of reducing visible distortion caused by surface irregularities produced by extruding sheets of polycarbonate materials. The aforesaid patent relates particularly to treating transparent sheets of polycarbonate materials such as the bisphenol-A, polycarbonate polyesters disclosed in U.S. Pat. No. 3,028,365 and the mixed carbonate-carbamate polyesters disclosed in U.S. Pat. No. 3,215,668. Such materials exhibit properties which render such materials desirable as substitutes for more conventional transparent glazing material such as glass. These materials are less dense than glass, are tougher than glass, and exhibit greater strength than glass of similar thickness. These materials are also tougher and exhibit greater impact strength than other plastic materials. The toughness and impact strength of the polycarbonate materials disclosed in the aforesaid patents are attributed to their high ductility and the plastic deformation characteristics which permit the polycarbonate to deform under great stress rather than crack or break in the manner characteristic of more brittle material such as glass and rigid plastic materials.

Because of these properties, transparent sheets of polycarbonate materials have been considered for use either alone or in conjunction with sheets of other transparent materials as high impact-resistant glazing materials for bullet penetration-resisting structures and protective glazings in schools, banks, sports arenas, etc. However, in spite of the high impact strength of the polycarbonate materials, transparent sheets of these materials have not been generally accepted for impact-resisting glazing purposes because of excessive visible distortion in the sheets.

Transparent sheets of polycarbonate materials in the range of thicknesses required for impact-resisting glazing purposes, e.g., 0.050-inch to about one-half inch thick, are formed by a hot extrusion process. Distortion bands visible in the extruded sheets are believed to result from contact between the surfaces of the incipient sheet and land surfaces of the extrusion dye as the sheets are being formed. Although the extruded sheets are transparent and exhibit a satisfactory level of optical clarity, the sheets are highly objectionable because of the distortion bands. The distortion bands are similar to those observed as "pattern" in exceptionally poor quality sheet glass and are generally attributed to a lack of surface smoothness.

Objectionable visible distortion similar to that observed in the extruded transparent polycarbonate sheets has also been observed in transparent sheets of methyl methacrylate, cellulose acetate, and vinyl materials. Visible distortion in transparent sheets of these materials has been reduced to a more acceptable level by hot press polishing the sheets. This has been accomplished by press polishing sheets of these materials between platens at a temperature within or greater than the accepted melting or softening range of temperatures for the material being pressed. At such an elevated temperature, the material flows readily and the surface irregularities are reduced by pressurized engagement with the smooth surfaced pressing platens.

Although the thermoplastic polycarbonate materials are similar in some respects to the thermoplastic materials press polished by prior art techniques, they exhibit other properties that render the prior art method of hot press polishing, i.e., press polishing at a temperature near or above the melting range of temperatures for the material being pressed, undersidable.

A melting range of 419 to 437 degrees Fahrenheit is reported for the bisphenol-A polycarbonate resins at page 24 of Polycarbonates, Reinhold, N.Y. (1962), by W. F. Christopher and D. W. Fox. The melting range of the polycarbonate materials is generally accepted as being in the range of about 400 to 450 degrees Fahrenheit.

A ⅛-inch thick transparent sheet of bisphenol-A polycarbonate stored in a dry room maintained at 74 degrees Fahrenheit and 18 percent relative humidity was pressed between platens heated to a temperature of 385 degrees Fahrenheit for a period of five minutes. The surfaces of the polycarbonate sheet darkened, rendering the sheet unacceptable for use as a transparent glazing.

Other sheets of polycarbonate materials press polished between platens heated to a temperature in the range of 400 to 450 degrees Fahreheit which were first subjected to a drying process, 300 degrees Fahrenheit under vacuum for 1½ to 4 hours, did not exhibit surface darkening. However, it is thought that the impact strength of the sheets was reduced as a result of the hot press polishing operation. Other sheets which are believed to have been hot press polished and subjected to stresses sufficient to cause breakage have been examined and found to break in a manner characteristic of brittle materials rather than show plastic deformation as observed with the tough, ductile, non-polished extruded sheets of polycarbonate material.

Thus, although press polishing at elevated temperatures approximating the melting range of the polycarbonate materials as has been practiced with other thermoplastic materials may be employed to reduce visible distortion, the optical clarity of the material and the impact strength may be adversely affected. Drying the polycarbonate sheet prior to hot press polishing may reduce the adverse effect on optical clarity, but the problem of changing the characteristics of the material which provide high impact strength still remains.

The factors causing the change from a ductile to a brittle material are not completely understood. Bisphenol-A polycarbonate resins are reported to have a glass transition temperature of about 300 degrees Fahrenheit and to be highly resistant to degradation by oxidation at temperatures up to about 300 degrees Fahrenheit. Either or both of these properties may be revived by reheating the formed sheet to a temperature about 300 degrees Fahrenheit. Although it is reported that the polycarbonate materials do not readily crystallize when heated above their glass transition temperature, the simultaneous application of an elevated pressure increases the probability of crystallization. Moreover, the presence of moisture, and perhaps other contaminating materials, also affects the material when reheated to a temperature greater than about 300 degrees Fahrenheit.

The aforesaid Canadian Pat. No. 857,789 describes a technique of press polishing polycarbonate material to reduce visible distortion resulting from surface irregularities without seriously effecting the impact strength or optical clarity of the polycarbonate sheet by pressing the sheet at a temperature well below the melting range of the material for a period of time sufficient to develop flow in the material.

The aforesaid patent suggests pressure greater than about 100 pounds per square inch. The upper limit of the pressure range for press polishing has not been established but pressures as high as about 2,000 pounds per square inch have been found to be satisfactory. A temperature in the range of 265 to 280 degrees Fahrenheit and a pressure of about 200 pounds per square inch is preferred. The elevated temperature and pressure are usually maintained for a period of time in excess of about 30 minutes.

As a means of facilitating the pressing operation, it is also preferred to position the transparent sheet of polycarbonate material between a pair of rigid pressing plates and then seal the assembly in a flexible, fluid-impermeable enclosure before subjecting the assembly to the elevated temperature and pressure required to reduce visible distortion in the sheet.

Pressing in the above-mentioned temperature range avoids the deleterious effects on ductility that have been observed and believed to result from hot press polishing. The patented invention also avoids the need for an extended, pre-pressing drying operation which is required when the polycarbonate sheets are to be subjected to temperatures greater than about 300 degrees Fahrenheit to avoid degradation by moisture which adversely affects the optical clarity of the transparent sheet.

The above technique has worked adequately for press polishing flat glass sheets and moderately curved sheets such as those bent to a gentle curvature, such as a cylindrical configuration of substantially uniform curvature.

When the above technique is employed for press bending polycarbonate sheets having complicated curvatures, such as are required for the shape of the F–111 windshield, various problems arose. These problems have been defined as destructive adhesion, detrimental abrasion and release deformation marks.

Destructive adhesion results when dissimilar materials fuse to one another in surface to surface contact so that they cannot be separated from one another without distorting the surface of either material. When curved polycarbonate sheets were press polished between glass sheets at a temperature of 300 degrees Fahrenheit and a pressure of 125 pounds per square inch and then cooled while maintaining the pressure, the glass sheets used as the press polishing member to press polish the polycarbonate sheet broke when the assembly of glass sheets and press polished polycarbonate sheet was cooling to room temperature. Similarly, when polycarbonate sheets were press polished between glass sheets at a temperature of 330 degrees Fahrenheit and at a pressure of 125 pounds per square inch for two hours, the glass molds used for press polishing broke when the assembly was cooling to room temperature.

Detrimental abrasion is defined as a surface phenomenon that has the appearance of a multitude of fine hair-like parallel lines arranged in spaced clusters throughout the surface of a plastic sheet that has been press polished. The press polished sheets of polycarbonate material treated as described in the preceding paragraph frequently developed detrimental abrasion during press polishing.

Release deformation marks are elongated lines on the surface of the plastic sheet that has been press polished. These lines have been observed in the press polished polycarbonate sheets from time to time.

The present invention has drastically reduced the occurrence and/or severity of destructive adhesion, detrimental abrasion, and release deformation marks.

SUMMARY OF THE INVENTION

The present invention suggests various precautions to either reduce considerably or avoid altogether the three types of problems listed above. The first precaution involves controlling the temperature range at which press polishing takes place to minimize destructive adhesion. The second and third precautions relate to separating the press polishing members from the press polished polycarbonate sheet after completing the press polishing treatment.

The second precaution requires maintaining the temperature of the press polishing members and that of the press polished polycarbonate sheet at a second temperature range near that prevailing during the press polishing operation until the press polishing members are separated from the press polished sheet, because detrimental abrasion has been associated with maintaining the press polishing members in pressurized engagement against the sheet of polycarbonate during cooling that follows press polishing. When the members and sheet are maintained in pressurized engagement as they cool from the temperature at which press polishing takes place, the substantially different rates of thermal contraction of the members and the sheet while in intimate surface to surface contact was found to be a major cause of the aforesaid detrimental abrasion in the press polished polycarbonate sheet.

The third precaution taught by the present invention involves removing the relatively rigid members from the relatively plastic press polished polycarbonate sheet along the interfaces therebetween at a substantially uniform rate. This third precaution arose from an awareness that the presence of release deformation marks were associated with an uneven rate of removal of the press polishing members from the pressed polished polycarbonate sheet.

BRIEF DESCRIPTION OF A PREFERRED EMBODIMENT

In a typical operation, a preformed polycarbonate sheet ¼ inch thick is mounted on a sheet of glass of convex elevation that serves as a mold. The glass mold is ¼ inch thick and has a curvature conforming to the shape desired for the windshield of the F–111 airplane. The polycarbonate sheet is heated for two hours at a temperature range between 275–300 degrees Fahrenheit while supported on the mold. During this time, the polycarbonate sags to conform to the upper surface of the glass sheet. After two hours of heating, the polycarbonate sheet has approximately the shape desired. However, it requires press polishing to smooth out any unevenness in its surface.

The preformed polycarbonate sheet is assembled between a pair of complementary shaped plates of glass whose surfaces have a high optical clarity to form a sandwich. The sandwich is inserted within a bag of the type disclosed in U.S. Pat. No. 3,311,517 to Leroy D. Keslar and John S. Rankin, assigned to PPG Industries, Inc. The bag is of substantially rectangular outline and is formed of an upper wall and lower wall of heat-sealable material. Each wall of the bag comprises an outer ply of polyethylene glycol terephthalate, commonly known as Mylar, and an inner ply of polyethylene having a preferred density range of .916 and .93 bonded thereto. Preferably, the Mylar outer ply is about .001 inch thick and the polyethylene inner ply .0035 inch thick. The polyethylene inner ply is grooved to provide a plurality of passageways for the escape of air entrapped within the bag.

The bag with its contents is evacuated and sealed and immersed in an autoclave. The autoclave is heated to 300 degrees Fahrenheit and pressure is applied to increase the pressure within the autoclave to 125 pounds per square inch. The temperature and pressure is held at the above conditions for about two hours to press polish the polycarbonate sheet sandwiched between the two sheets of glas with the high optical clarity surfaces and to cause the polycarbonate sheet to take its final form conforming to the highly polished optical surfaces of the glass members.

According to the present invention, the pressure is reduced while the assembly is maintained at approximately the temperature range of the press polishing operation. The vacuum bag is opened and removed from the autoclave. The glass sheets are rapidly stripped at a substantially uniform rate from the opposite surfaces of the press polished polycarbonate sheet in one continuous motion each without stopping before the plastic temperature cools to about 50 degrees Fahrenheit below the temperature of the press polishing operation. As an alternative, the assembly is transferred to an oven at atmospheric pressure and 300 degrees Fahrenheit and each glass sheet stripped from the polycarbonate sheet in one continuous motion without stopping while the assembly is within the furnace.

The polycarbonate sheet used in the experiment described above was bisphenol-A type sold under the trade name of Lexan grade S. L. 2000-111 by the General Electric Company. Such material has a heat deflection temperature of 270 degrees Fahrenheit at a pressure of 264 pounds per square inch, which are the conditions defined by the American Society for Testing Materials.

The following limits should be observed in practicing the present invention using glass members to press polish bisphenol-A type of polycarbonate sheets.

(1) The polycarbonate should be maintained at a temperature range between about 275 degrees Fahrenheit and about 330 degrees Farhenheit during press polishing to promote press polishing while avoiding destructive adhesion between the glass and the polycarbonate.

(2) The temperature of the assembly of the transparent plastic sheet and the mold members should not be permitted to cool or rise outside the range of temperature prevailing during the press polishing operation by more than about 50 degrees Fahrenheit during the interval between the completion of the press polishing operation and the separating or stripping of the glass members from the press polished polycarbonate sheet. Otherwise, spaced collections of fine hair-like parallel lines characteristic of detrimental abrasion appears throughout the surface of the polycarbonate or destructive adhesion may occur.

(3) Stripping must be done continuously and rapidly without any abrupt change in rate of separation of the glass members from the surface of the polycarbonate sheet. Otherwise, one or more elongated lines defined as release deformation marks will result in the related plastic surface of the work piece at each region of a change in rate of separation.

It should be noted that although the embodiment described specifies improvements in the method of press polishing a sheet of polycarbonate material between glass pressing members, the present invention is equally applicable to reduce visible distortion caused by surface irregularities on transparent sheets of polycarbonate materials used as substitutes for glass in windows when press polishing members made of materials other than glass but capable of having highly polished optical surfaces are used. Other smoothly polished materials suitable for use in press polishing include various bright metals, bright metal alloys and smoothly polished refractory materials. Brass, steel, copper, aluminum, gold, silver, platinum, mica, quartz and various other materials that are rigid and do not adhere readily to polycarbonates at temperatures up to and above the heat distortion temperature of the polycarbonate are suitable for providing an improved method of press polishing polycarbonate sheets.

It is understood that while particular temperature ranges have been recited for press polishing polycarbonates using glass, that these temperatures may be varied somewhat when using other materials for the press pressing members other than glass, subject to the limitations imposed by the polycarbonates.

The form of the invention shown and described above represents an illustrative, preferred embodiment. It is understood that various changes may be made without departing from the gist of the invention as defined by the claimed subject matter that follows:

We claim:
1. In the art of press polishing a sheet of polycarbonate material comprising holding said sheet in face to face contact against a pair of members of relatively rigid material having optically smooth surfaces of complementary shape conforming to the shape desired for said sheet of polycarbonate material at a first temperature range between about 275 degrees Fahrenheit and about 330 degrees Fahrenheit and a pressure range between about 100 and about 2000 pounds per square inch for sufficient time to smooth any surface imperfections in said sheet of polycarbonate material, the relatively rigid material having a tendency to adhere to said polycarbonate material at temperature above 300 degrees Fahrenheit and having a coefficient of thermal expansion significantly less than that of said sheet of polycarbonate material, the improvement comprising,

(1) reducing the pressure applied by said members against the opposite press polished surfaces of said sheet while maintaining the temperature of said members and said sheet at a second temperature range having a minimum temperature 50 degrees Fahrenheit below the temperature maintained during said press polishing operation and a maximum temperature below that at which said relatively rigid material adheres to said sheet of polycarbonate material, (2) removing said relatively rigid members from the opposite surfaces of said sheet of polycarbonate material at an approximately uniform rate of removal while said sheet and said members remain within said second temperature range, and (3) cooling said press polished sheet of polycarbonate material, whereby damage associated with destructive adhesion, detrimental abrasion and release deformation marks is minimized.

2. The improvement as in claim 1, wherein said members of relatively rigid material are composed of glass.

3. The improvement as in claim 1, wherein said members of relatively rigid material are composed of a bright metal or metal alloy.

4. The improvement as in claim 1, wherein said sheet of polycarbonate material has a shape of non-uniform curvature.

5. The improvement as in claim 1, wherein said sheet of polycarbonate material is assembled between said members to form a sandwich, the sandwich is inserted within a thin, flexible bag, the bag is evacuated and sealed and immersed within an autoclave and exposed to said first temperature range and said pressure range, said improvement further including removing said sandwich from said bag at said second temperature range.

References Cited

UNITED STATES PATENTS

| | | | |
|---|---|---|---|
| 3,681,483 | 8/1972 | Moore | 264—1 |
| 2,443,390 | 6/1948 | Kingston | 264—1 |
| 2,551,005 | 5/1951 | Johnson | 264—284 |
| 2,434,541 | 1/1948 | Bierer | 156—80 |

FOREIGN PATENTS 857,789   12/1970   Canada.

ROBERT F. WHITE, Primary Examiner

R. R. KUCIA, Assistant Examiner

U.S. Cl. X.R.

264—284, 293

UNITED STATES PATENT OFFICE
CERTIFICATE OF CORRECTION

Patent No. 3,784,655　　　　　　　　　　Dated January 8, 1974

Inventor(s) Richard R. Lewchuk and Norman Shorr

It is certified that error appears in the above-identified patent and that said Letters Patent are hereby corrected as shown below:

Column 6, Claim 1, line 21, "temperature" should be --temperatures--.

Signed and sealed this 21st day of May 1974.

(SEAL)
Attest:

EDWARD M. FLETCHER, JR.　　　　　　　C. MARSHALL DANN
Attesting Officer　　　　　　　　　　Commissioner of Patents